(12) United States Patent
Garrott et al.

(10) Patent No.: US 9,962,022 B2
(45) Date of Patent: May 8, 2018

(54) COLLAPSIBLE, FLOW-RESTRICTED, CONTROLLED-POUR PITCHER FOR BREWING COFFEE

(71) Applicants: Barbara Garrott, Troy, ID (US); Douglas Garrott, Troy, ID (US)

(72) Inventors: Barbara Garrott, Troy, ID (US); Douglas Garrott, Troy, ID (US)

(73) Assignee: Orphan Espresso LLC, Troy, ID (US)

( * ) Notice: Subject to any disclaimer, the term of this patent is extended or adjusted under 35 U.S.C. 154(b) by 0 days. days.

(21) Appl. No.: 15/099,535

(22) Filed: Apr. 14, 2016

(65) Prior Publication Data

US 2017/0295966 A1    Oct. 19, 2017

(51) Int. Cl.
- B67D 3/00 (2006.01)
- A47G 19/12 (2006.01)
- A47J 31/46 (2006.01)
- A45F 3/20 (2006.01)

(52) U.S. Cl.
CPC ............ *A47G 19/12* (2013.01); *A45F 3/20* (2013.01); *A47J 31/465* (2013.01)

(58) Field of Classification Search
CPC .. A47J 31/06; A47J 19/12; A47J 19/14; A47J 19/20; A47J 31/464; A47F 3/20
USPC ...... 222/564, 604, 605, 189.02–189.07, 547, 222/606; 220/419, 734, DIG. 5; D7/316–319
See application file for complete search history.

(56) References Cited

U.S. PATENT DOCUMENTS

| 795,408 | A | * | 7/1905 | Nebinger | B65D 81/3222 222/129 |
| 990,520 | A | * | 4/1911 | Irwin | F23D 3/00 431/282 |
| 1,339,008 | A | * | 5/1920 | Strong | A47J 31/14 210/244 |
| 1,558,839 | A |  | 10/1925 | Clark |  |
| D74,713 | S | * | 3/1928 | Beam | D7/319 |
| 2,442,047 | A | * | 5/1948 | Kemper | B65D 23/06 222/566 |
| D165,827 | S | * | 2/1952 | Cowan | D7/319 |
| 2,610,490 | A | * | 9/1952 | Tupper | A47G 19/12 220/771 |
| D181,348 | S | * | 11/1957 | Dube et al. | D7/318 |

(Continued)

FOREIGN PATENT DOCUMENTS

GB           556053      *  2/1946  ............ A47G 19/12

*Primary Examiner* — Lien Ngo
(74) *Attorney, Agent, or Firm* — Duncan Palmatier

(57) ABSTRACT

A collapsible hot liquid pitcher with an adjustable flow restrictor is disclosed that provides an easily controlled pour of hot water from the spout at the end of the pitcher's neck. The pitcher can be made of a rubbery material so that it can be compressed into a small shape for traveling. An insulating layer on the pitcher prevents the hot liquid from burning the user's hand during pouring. An adjustable flow restrictor gate with different sized flow sluices is provided in the pitcher's neck so that the amount of hot water admitted through the flow restrictor gate into the neck can be changed. The restrictor gate can be removed to change the desired flow. The orientation of the restrictor gate, the shape of the pitcher's neck and spout, and the shape and angle of the spout's face work to produce a controlled flow of hot water that pours downwardly in a steady, vertical stream for brewing.

7 Claims, 5 Drawing Sheets

(56) References Cited

U.S. PATENT DOCUMENTS

| | | | |
|---|---|---|---|
| D210,237 S | | 2/1968 | Mestrovic |
| 3,400,855 A | * | 9/1968 | Alexander .......... A47G 19/2211 215/6 |
| D214,392 S | | 6/1969 | Gulotta |
| 3,599,846 A | * | 8/1971 | Stephenson .......... B65D 47/263 222/553 |
| 3,624,788 A | * | 11/1971 | McMahon ............. A47G 19/12 215/395 |
| 3,844,450 A | | 10/1974 | Johnson |
| D268,158 S | * | 3/1983 | Doyel ......................... D10/46.3 |
| D276,490 S | * | 11/1984 | Zimmermann ................ D7/317 |
| D313,726 S | | 1/1991 | Scherer |
| D328,546 S | * | 8/1992 | Unger ............................. D7/317 |
| 5,135,128 A | | 8/1992 | Kuhn |
| D345,669 S | | 4/1994 | Piret |
| D356,004 S | | 3/1995 | VanValkenburg |
| D389,006 S | * | 1/1998 | Demore ......................... D7/316 |
| D395,571 S | * | 6/1998 | Antista ......................... D7/302 |
| 6,231,226 B1 | | 5/2001 | Neidigh |
| 7,191,913 B2 | * | 3/2007 | Byrne .................... B44D 3/121 220/570 |
| 8,286,825 B2 | * | 10/2012 | Billado, Jr. ............. B44D 3/127 220/762 |
| 8,485,388 B2 | * | 7/2013 | Tuan ..................... A47G 19/12 206/218 |
| D707,487 S | | 6/2014 | Weernink |
| D724,375 S | * | 3/2015 | Thonis ........................... D7/319 |
| D750,426 S | | 3/2016 | Bann |
| 2014/0175134 A1 | * | 6/2014 | McGinley .............. A47G 19/12 222/465.1 |

* cited by examiner

COLLAPSIBLE, FLOW-RESTRICTED, CONTROLLED-POUR PITCHER FOR BREWING COFFEE

FIELD OF THE INVENTION

The present invention relates to a portable pitcher for pouring hot water to brew coffee. More specifically, the invention relates to an easily portable pitcher with an adjustable flow restrictor gate that allows for a controlled amount of hot water to be poured from the pitcher onto ground coffee beans.

BACKGROUND OF THE INVENTION

Increasing interest in perfecting the art of brewing coffee and tea has led to kettles that use small-diameter spouts to control the flow of water in order to pour the hot water slowly and in small quantities over coffee grounds or tea leaves. From the traditional kettles with large spouts, such as shown in U.S. Pat. No. 1,558,839 to Clark, the trend turned to mid-century kettles with short spouts, such as shown in U.S. Pat. No. 5,135,128 to Kuhn. Both designs were useful for pouring out large quantities of hot water quickly, but were not suited to pouring small amounts of hot water in a slow, measured, controlled flow over a longer time in order to produce more nuanced flavors. As the art of coffee and tea making has developed recently, interest turned to traditional "Japanese Style" kettles with long, thin spouts, often referred to as "gooseneck" kettles. FIG. 1 shows one such kettle 7 with a long, thin, curving gooseneck spout 8 from which hot water can be poured in slow, controlled quantities. Depending on the diameter of the spout, more or less hot water will pass through at any given inclination of the kettle 7, although such designs are susceptible to burping spurts of water when the energy of the hot water in the kettle finds release from the spout.

These designs have several disadvantages. Such kettles are not easily portable, so people who want to brew their own coffee or tea while traveling and staying in hotels are forced to use cheap coffee makers designed without regard to the subtleties of the brewing art. Those who prefer tea to coffee will readily appreciate that such hotel coffee makers are ill suited to brewing tea, since the pots have, over the years, come to impart a coffee flavor, and a bad flavor at that. Those who drink coffee and travel with their own coffee beans, grinders, funnels and filters, will have similar criticisms of such machines. But, traveling with a metal kettle is not practical, since they are bulky and the goosenecks are delicate and prone to bending, crimping, and breaking.

Moreover, gooseneck kettles are limited by the diameter spout supplied with the kettle. To change the flow characteristics of a gooseneck kettle, it is necessary to obtain multiple kettles, which is expensive and impractical. Moreover, while such kettles allow for a more controlled pour, they require skill to avoid spurting out boiling water from the spout.

Needed is a device that is easy to transport, especially when traveling, allows for the easy adjustment of the flow of hot water from the spout, gives a controlled pour, and avoids spurting boiling water.

SUMMARY OF THE INVENTION

The present invention is a collapsible hot liquid pitcher with an adjustable flow restrictor that provides an easily controlled pour of hot water from the spout at the end of the pitcher's neck. The disclosed pitcher can be made of a rubbery material so that it can be bent, folded, and compressed into a small shape, which makes it especially useful for traveling. An insulating layer can be added to the pitcher to allow a user to hold it without burning the hand. In the pitcher's neck is an adjustable flow restrictor gate with different sized flow holes, so that the amount of hot water admitted from the pitcher's body, through the flow hole in the restrictor gate, and into the neck can be changed. The restrictor gate is a small, metal plate that fits in retaining grooves in the pitcher's neck. To change the desired flow hole, the gate is pulled out of the retaining grooves, rotated, and slipped back in. The orientation of the restrictor gate, the shape of the pitcher's neck and spout, and the shape and angle of the spout's face work to produce a controlled flow of hot water that pours downwardly in a steady, vertical stream toward the ground coffee or tea leaves being infused during the brew.

DETAILED DESCRIPTION

Figure 1:
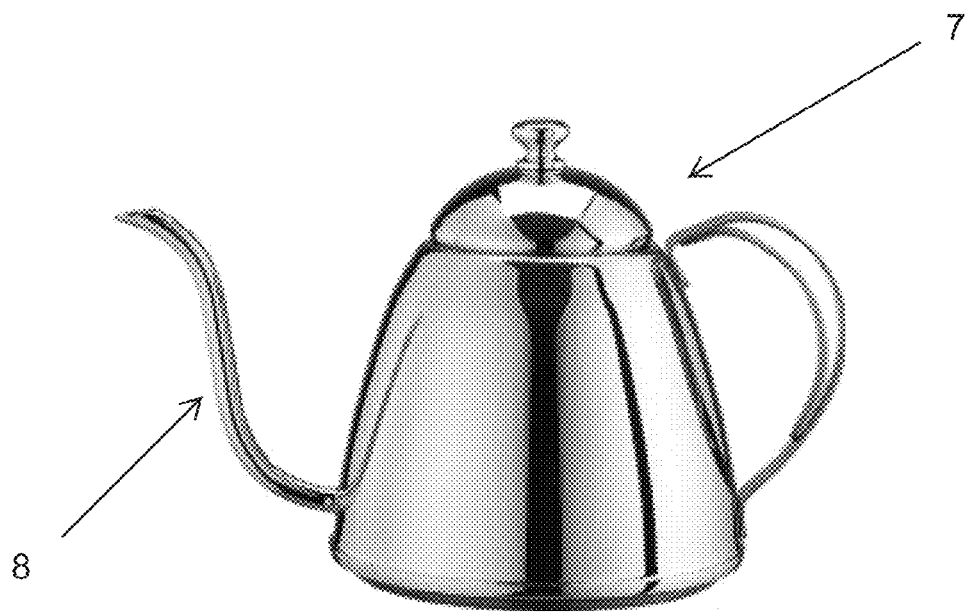
FIG. 1 is a side view of a prior art coffee brewing kettle with a small diameter gooseneck spout.
Figure 2:
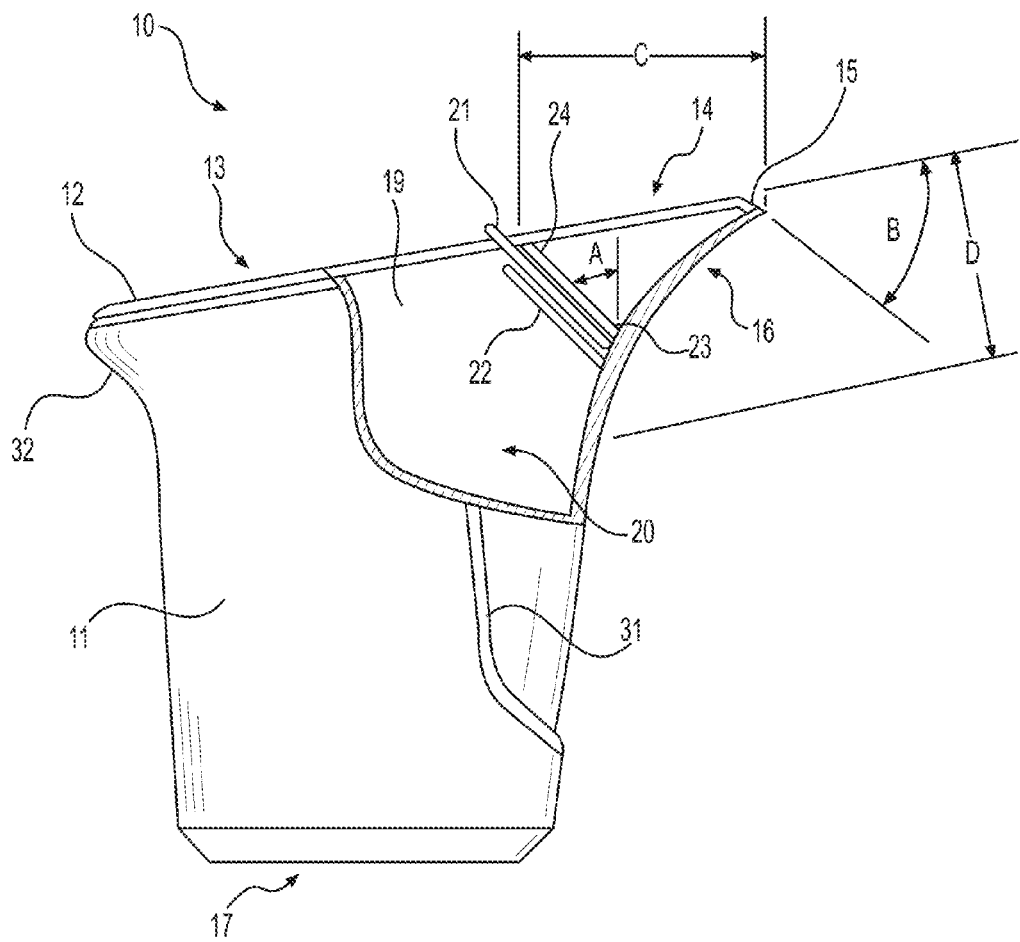
FIG. 2 is a partial cut-away, side view of a preferred embodiment of the pitcher of the present invention.

FIG. 2 shows a partial cut-away, side view of a preferred embodiment of the pitcher 10 of the present invention. The pitcher 10 is formed by side walls 11 and bottom 17. The side walls 11 have a top rim 12 at the top opening 13. As seen in the top view shown in FIG. 3, the pitcher 10 has a generally egg-shaped oval configuration wherein the narrower end forms a pouring neck 14 terminating in a spout 15. The front of the pitcher 10 extends up from the bottom 17 to an outwardly projecting curved chin 16, at the underside of the neck 14, that reaches the spout 15. Near the wider, back side of the pitcher 10, near the rim 12, is an ergonomic bulge 32 that makes holding the pitcher 10 in the purlicue of a hand (not shown) more comfortable. The inside surfaces 19 of the walls 11 and inner surface 18 of the bottom 17 create an interior space 20 for holding a liquid 41 (shown in FIG. 6), such as water. In the disclosed embodiment, the size of the pitcher 10 is designed to hold and function properly with up to 400 ml of liquid 41 and be comfortable to hold in one hand. It will be appreciated that larger or smaller sizes are within the scope of the invention. The preferred embodiment is specifically intended to hold a hot liquid, such as hot water for brewing coffee. To prevent the side walls 11 of the pitcher 12 from becoming too hot to hold, an insulating layer 31 is disposed over at least some of the walls 11. By holding the pitcher 10 and tipping it forward, liquid 41 held in the interior space 20 will move forward into the increasingly narrow pouring neck 14 and be directed toward the spout 15 from which it will spill out 42 in a controlled pour (shown in FIG. 6), as described below.

The walls 11 and bottom 17 of the pitcher 10 are formed of a material that will hold a liquid 41, including hot liquids.

The preferred embodiment is formed of silicone 70 durometer (70A) rubber material. The insulating layer 31 may also be formed of this material, although other insulating materials may be used. The disclosed shape of the pitcher 10 can be created by compressive, injection or other molding processes for such rubber materials. The rubber properties of the silicone material allow the pitcher 10 to be compressed, bent, folded, or rolled into a compact shape, which adapts the pitcher 10 of the present invention to travel, because it is light and is compressible so as to fit into a small space.

Figure 3:
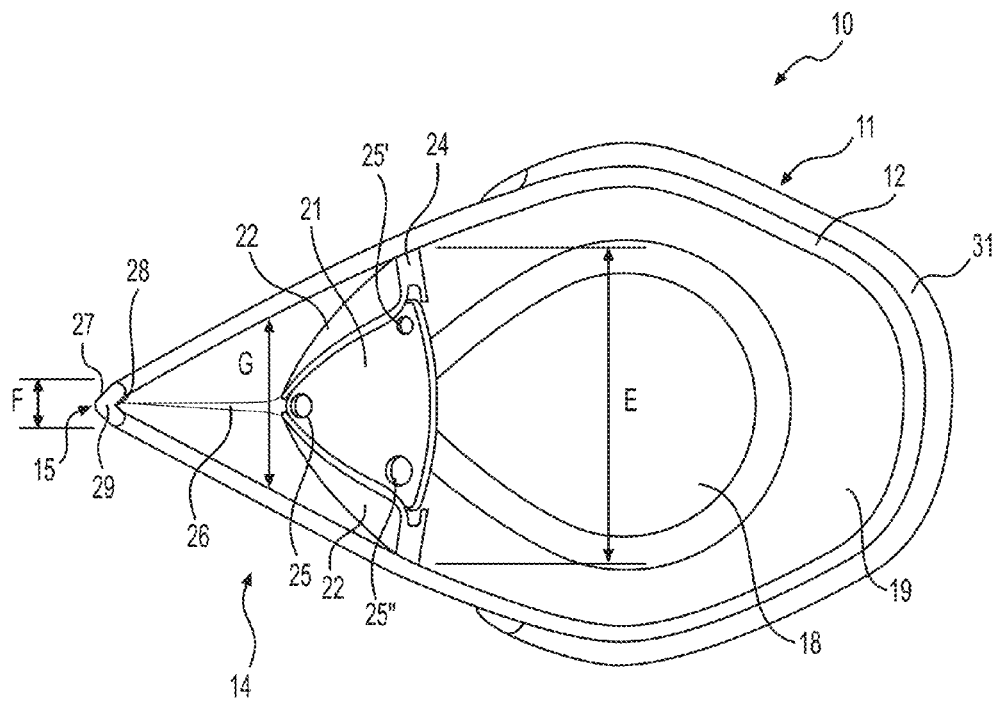
FIG. 3 is a top view of a preferred embodiment of the pitcher of the present invention.
Figure 4:
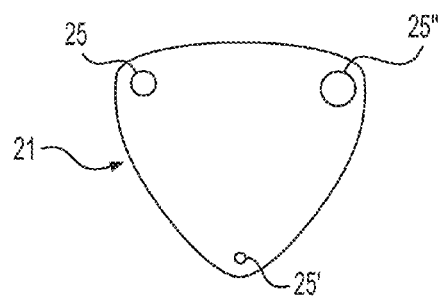
FIG. 4 is a front view of a preferred embodiment of the pitcher of the present invention.
Figure 5:
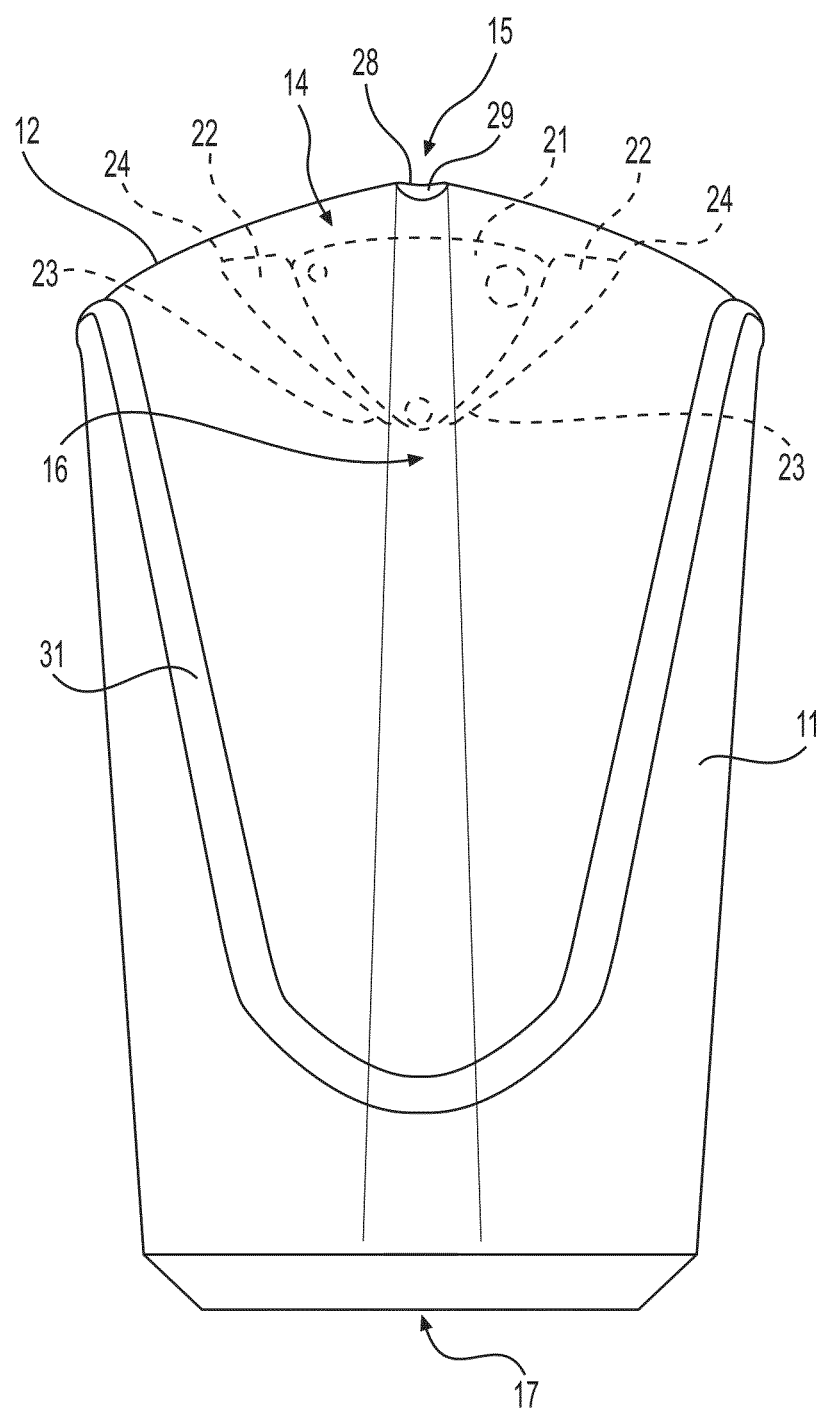
FIG. 5 is a front view of the flow restrictor gate component of the present invention.

As shown in FIGS. 3 and 4, within the pouring neck 14 is interposed a flow restrictor gate 21. In the preferred embodiment and as shown in FIG. 5, the restrictor gate 21 is a generally triangular plate. Flow restrictor sluices or holes 25, 25', and 25" in each corner of the triangular plate 21 are of different sizes so as to allow more or less liquid 41 through. As shown, restrictor sluice 25' is the smallest size and allows the least liquid through, medium sized sluice 25 allows more, and the largest sluice 25" allows the most. In the preferred embodiment, the smallest sluice 25' is 3 mm, the medium sized sluice 25 is 4 mm, and the largest sluice 25" is 5 mm. The restrictor plate 21 is held in retaining grooves 22 formed as part of the interior of the neck 14. The retaining grooves 22 are deepest and extend most into the interior space 20 near the top edge 12 of the pitcher 10, and gradually become more shallow near the neck's interior channel 26 (shown in FIG. 3). The restrictor plate 21 is slid into the retaining grooves 22 so that the selected flow restrictor sluice (25, 25', or 25") is oriented bottom-most, nearest the channel 26, so as to allow liquid 41 flow through the sluice (25, 25', or 25") without interference from the retaining grooves 22. The silicone rubber material of the pitcher 10 also forms the retaining grooves 22, which are sized to receive the restrictor plate 21 tightly, and grip the plate 21 by a friction fit. The restrictor gate 21 is oriented as a barrier to the liquid 41 held in the interior space 20 of the pitcher 10. The restrictor gate 21 is inclined backward at an angle A so that, as the pitcher 10 is tipped forward, liquid 41 will not pour up the plate 21, but will be effectively blocked, except for liquid 41 flowing through the flow sluice (25, 25', or 25"). In the preferred embodiment, the angle A of the restrictor plate 21 is about 30 degrees back from vertical, which maintains an effective barrier to liquid 41 slopping over until the pitcher 10 is tipped almost horizontal.

Figure 6:
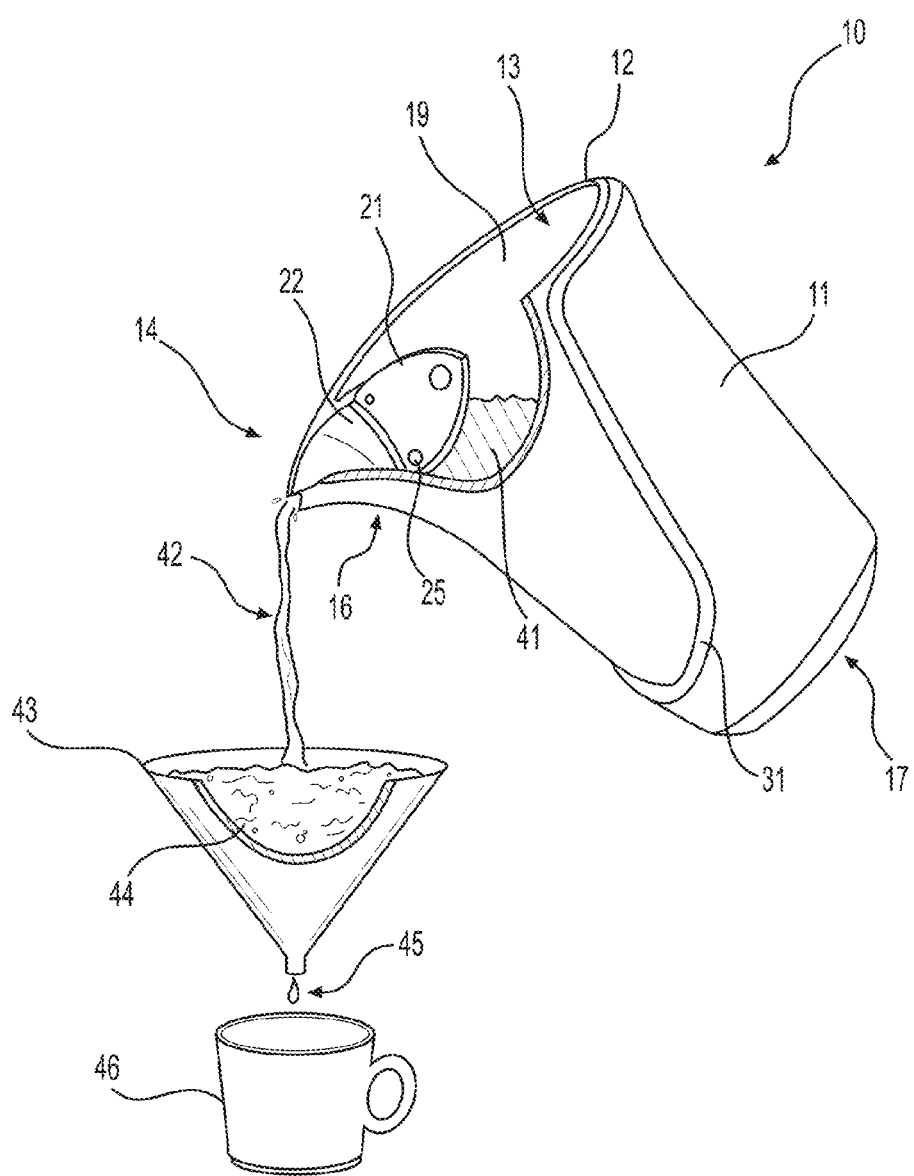
FIG. 6 is a three-quarter perspective view of a preferred embodiment of the pitcher of the present invention in use.

The pouring neck 14 is configured to direct the flow of liquid 41 through one of the flow sluices or holes (25, 25', or 25") along the interior channel 26 of the neck 14 toward the spout 15. The interior channel 26 narrows as it approaches the spout 15 so that the liquid 41 will attain a steady, controlled stream. When the liquid 41 reaches the spout 15, the shape and angle B of the spout 15 are configured to direct the liquid 41 over the face 29 of the spout 15 in a way that causes the liquid 41 to fall vertically, thereby preventing uncontrolled outwardly-directed spilling. In the preferred embodiment, the proportions of the neck help to funnel liquid 41 into a controlled flow 42, as shown in FIG. 6. The length C from the top 24 of the retaining grooves 22 to the spout 15 is about the same (approximately 55 mm for a 400 ml pitcher) as the length D from the lower part of the chin 16, where it begins to curve, to the spout 15. Similarly, the width E of the neck 14 (approximately 60 mm for a 400 ml pitcher) at the top 24 retaining grooves 22, is about half (about 30 mm) of the width G of the neck 14 midway (about 38 mm) between E and the width F of the face 29 of the spout 15 (about 8.5 mm). The spout 15 is generally V-shaped, with a vertex 28 aligned with the channel 26, a bottom lip 27, and the face 29 between the vertex 28 and bottom lip 29. In the preferred embodiment, the face 29 of the spout 15 is angled B at about 80 degrees down from the top edge 12 of the pitcher 10. The shape of the neck 14, the interior channel 26 approaching the spout 15, the angle B of the spout 15, and the flat face 29 of the spout 15 contribute to the controlled flow of the liquid 41. The shape of the neck 14 and angle A of the flow restrictor gate 21 allows for control of the liquid 41 as it approaches the gate 21 so that the user can avoid pouring liquid 41 over the top of the plate 21. The V-shaped neck 14 and channel 26 provides a better control of the liquid 41 as well, inasmuch as a more horizontal approach directs the liquid 41 toward the spout 15 in a controlled flow rather than in a gush that spills outward from the spout 15. The spout 15 angle B, in relation to the horizontal plane, while pouring liquid 41, is always greater than 45 degrees at the initial part of the pour, and approaches 90 degrees when the pitcher 10 is nearly empty. At angles under than 45 degrees, liquid 41 will dribble, but with the configuration of the neck 14 and the flow restrictor gate 21, the pitcher 10 can be tipped more than 45 degrees without breaking the liquid's 41 tension, thereby preventing dribbling. The flat 29, sharp edge break 28 at the spout 15 helps to break the liquid's 41 tension for a clean, non-dribbling pour. Without the sharp edge 28, the liquid 41 will tend to crawl down the outside of the pitcher's neck 14, dribbling the liquid 41.

FIG. 6, shows the operation of the pitcher 10. The pitcher 10 is tipped at about 45 degrees from the vertical forcing the hot liquid 41 against the back of the flow restrictor plate 21. The liquid 41 passes through one of the flow control sluices (25, 25', or 25"), along the neck's 14 interior channel 26 to the spout 15. As described above, the shape of the neck 14, the interior channel 26 approaching the spout 15, the angle B of the spout 15, and the flat face 29 of the spout 15 contribute to a controlled flow of the liquid 41 as t pours downwardly in a steady, vertical stream 42. The hot liquid 41 can then be poured into a filter cone 43 with coffee grounds 44 in a controlled stream 42 to produce a desired drip 45 of coffee into a cup 46.

The drawings and description set forth here represent only some embodiments of the invention. After considering these, skilled persons will understand that there are many ways to make a collapsible, flow-restricted, controlled-pour pitcher for brewing coffee according to the principles disclosed. The inventor contemplates that the use of alternative structures, materials, or manufacturing techniques, which result in a pitcher according to the principles disclosed, will be within the scope of the invention.

We claim:

1. A controlled-pour pitcher comprising:
   a pitcher having a bottom and sides extending up from the bottom, a peripheral rim along an end of the sides opposite from the bottom, wherein the rim forms a top opening of the pitcher, and wherein the bottom, sides, and rim define an interior space adapted to hold a liquid,
   a neck formed adjacent a front portion of the opening and side of the pitcher, the neck having a chin extending from the front portion of the side of the pitcher upward and outward to the front portion of the top opening terminating in a spout, the front portion of the top opening defining a top neck rim portion of the pitcher's peripheral top rim, the chin further having neck sides extending upwardly and outwardly to the neck rim to form a channel from the interior space to the spout,
   a flow restrictor gate releaseably retained between the interior space and the channel, wherein the restrictor gate further comprises a plurality of differently proportioned flow control sluices that limit the amount of liquid that may pass from the interior space to the channel, and wherein the flow restrictor gate is a generally triangular plate sized to be received within a part of the interior surface of the sides between the interior space and the channel, and wherein the generally triangular flow restrictor gate further comprises a differently proportioned flow control sluice at each vertex of the triangular plate, and wherein each differently proportioned flow control sluice at each of the vertices of the generally triangular plate is a different size from each of the other differently proportioned control sluices at the other two vertices of the generally triangular plate, a pair of oppositely disposed retaining grooves formed on an interior surface of the sides of the pitcher for retaining the flow restrictor gate between the interior space and the channel, wherein each of the pair of retaining grooves has a top part adjacent the peripheral top rim and a lower part at the interior surface of the sides, and wherein each of the retaining grooves further comprises a pair of oppositely disposed lips defining each retaining groove and wherein each pair of lips is proportioned to releaseably grip an edge of the triangular plate.

2. The controlled-pour pitcher of claim 1 wherein the top part of the retaining groove lips extend father inward of the interior surface than the lower part of the retaining groove lips extend inward of the interior space, and further wherein only the differently proportioned flow control sluice nearest the channel allows liquid to pass from the interior space to the channel.

3. The controlled-pour pitcher of claim 1 wherein the flow restrictor gate is inclined away from the front portion of the opening and toward the interior space at an angle from vertical.

4. The controlled-pour pitcher of claim 3 wherein the angle of inclination of the flow restrictor gate from vertical is between 20 degrees and 50 degrees.

5. A controlled-pour pitcher comprising:

a pitcher having a bottom and sides extending up from the bottom, a peripheral rim along an end of the sides opposite from the bottom, wherein the rim forms a top opening of the pitcher, and wherein the bottom, sides, and rim define an interior space adapted to hold a liquid, a neck formed adjacent a front portion of the opening and side of the pitcher, the neck having a chin extending from the front portion of the side of the pitcher upward and outward to the front portion of the top opening terminating in a spout, the front portion of the top opening defining a top neck rim portion of the pitcher's peripheral top rim, the chin further having neck sides extending upwardly and outwardly to the neck rim to form a channel from the interior space to the spout, a flow restrictor gate releaseably retained between the interior space and the channel, wherein the restrictor gate further comprises a plurality of differently proportioned flow control sluices that limit the amount of liquid that may pass from the interior space to the channel, wherein the flow restrictor gate is a generally triangular plate sized to be received within a part of the interior surface of the sides between the interior space and the channel, and wherein the generally triangular flow restrictor gate further comprises a differently proportioned flow control sluice at each vertex of the triangular plate, and wherein each differently proportioned flow control sluice at each of the vertices of the generally triangular plate is a different size from each of the other differently proportioned control sluices at the other two vertices of the generally triangular plate, and wherein only the differently proportioned flow control sluice nearest the channel allows liquid to pass from the interior space to the channel into the channel, and further wherein the flow restrictor gate forms a solid barrier to fluid passing through other than through the differently proportioned flow control sluice nearest the channel.

6. The controlled-pour pitcher of claim 5 wherein one of the differently proportioned flow control sluices has a diameter of 5 mm and the other two differently proportioned flow control sluices are smaller that the 5 mm differently proportioned flow control sluice.

7. The controlled-pour pitcher of claim 5 wherein the differently proportioned flow control sluices are sized 3 mm, 4 mm and 5 mm.

\* \* \* \* \*